(No Model.)

T. KUNDTZ.
WHEEL RIM.

No. 596,424. Patented Dec. 28, 1897.

Witnesses.
E. B. Gilchrist
Ella E. Tilden

Inventor
Theodor Kundtz
By Lynch, Dorer & Donnelly
his Attorneys

UNITED STATES PATENT OFFICE.

THEODOR KUNDTZ, OF CLEVELAND, OHIO.

WHEEL-RIM.

SPECIFICATION forming part of Letters Patent No. 596,424, dated December 28, 1897.

Application filed February 3, 1896. Serial No. 577,797. (No model.)

*To all whom it may concern:*

Be it known that I, THEODOR KUNDTZ, of Cleveland, Cuyahoga county, Ohio, have invented certain new and useful Improvements in Wheel-Rims; and I do hereby declare the following to be a full, clear, and exact description of the invention, such as will enable others skilled in the art to which it pertains to make and use the same.

My invention relates to improvements in wheel-rims, and more especially to a wooden rim designed for use in the manufacture of bicycle-wheels provided with a tire consisting of an inner tube and a case embracing said tube and held to the wheel-rim by the inflation of the tube.

The object is to provide a rim designed for a tire of the character indicated that will not be liable to be split longitudinally at the points where the tire-tube case engages the rim.

With this object in view my invention consists in certain features of construction and combinations of parts hereinafter described, and pointed out in the claims.

Figure 1:
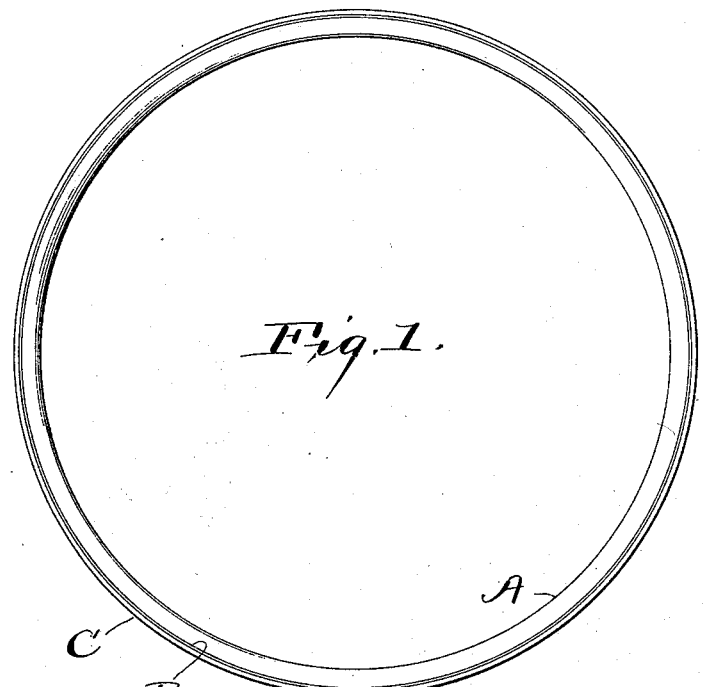
Figure 2:
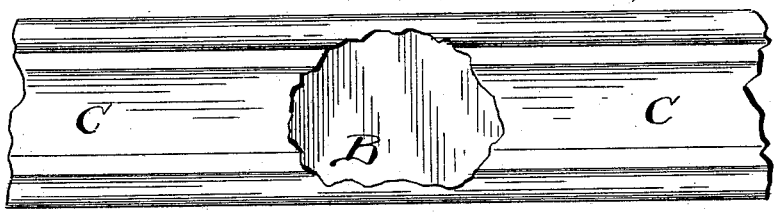
Figure 3:
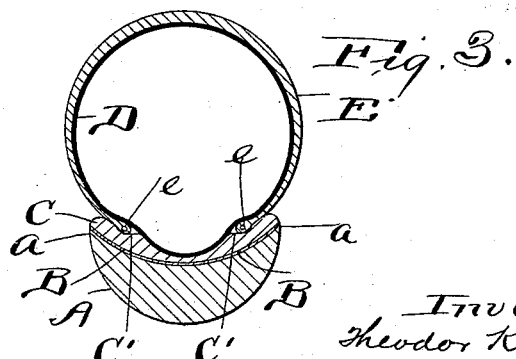

In the accompanying drawings, Figure 1 is a side elevation of a rim embodying my invention. Fig. 2 shows an outer peripheral view of a portion of the rim and shows a portion of the outer piece that forms the concave outer periphery of the rim broken away to show the comparatively thin cross-grained layer interposed between said piece and the piece that forms the inner and convex periphery of the rim. Fig. 3 is a cross-section of the rim and shows the rim provided with a tire.

As is well known in the trade, the case of the inner tire-tube of a tire of the character indicated when the tube is inflated is held to the rim by the pressure of the inflated tube and engages depressions or recesses formed within and extending circumferentially of the inner periphery of the rim. A rim provided with said tire is subjected to great strain, having a tendency to split the rim, especially when the wheel strikes an obstruction in the roadway at the points where the tire-case engages the rim.

The object of my invention, therefore, as already indicated, is to provide a wheel-rim that possesses the requisite strength and durability for use in connection with the tire to which reference has hereinbefore been made; and with this object in view my improved rim comprises an inner circularly-bent wooden strip A, convex upon its inner periphery and concave and curved upon its outer periphery, as shown very clearly in Fig. 3. To the outer and curved concave periphery of strip A is cemented a comparatively thin wooden strip or series of strips B, extending circumferentially and from edge to edge of the concave periphery of strip A. Piece or pieces B are cross-grained—that is, the cross-grained layer B is bent in a line crosswise of its grain into the concavity in strip A and fitted and cemented to the curved walls of said concavity and has its grain running crosswise of said walls and consequently crosswise of the rim. Layer B, when applied, is therefore concave externally in cross-section. The circularly-bent wooden tire-receiving strip C extends externally of and annularly around layer B and has its inner side convex or shaped to conform to the concave surface of said cross-grained layer B. Strip C is preferably cemented to layer B. The central portion of the outer and concave periphery of strip C forms the seat for the tire, (see Fig. 3,) and said periphery is, if used for the tire shown in Fig. 3, provided with two depressions or recesses C' between the central portion and opposite edges, respectively, for receiving the enlarged edges e of the tire-case E, that is held to the rim by the inflation of tube D, as already indicated.

The concavo-convex strip A has its longitudinal edges a extending to or beyond the tire-case-receiving portions of the outer strip C, and consequently the reinforcing-ring B and C extends also to or beyond said portions of the outer strip, so that there is no liability whatever of the wheel-rim being split longitudinally at the points hereinbefore referred to, which points are indicated by dotted lines in Fig. 3.

It will be readily perceived that the outer and inner rings of the rim are produced like fellies of ordinary wheels, and, being integral in character, act like the member of a clamp to hold the glue-covered and cross-grained strip in its final position until the glue is dry. A composite wheel-rim is thus produced in which only one of the layers is bent transversely into its final shape and in which the remaining layers are so thick as to be incapable of transverse bending and are provided with corresponding transversely-curved surfaces, between which the first-named layer is secured.

What I claim is—

1. A wooden wheel-rim consisting of a thick, inflexible, inner wooden ring A having a peripheral cavity that is curved in cross-section, a relatively thin wooden reinforcing-layer fitting and secured in, and lining and covering the walls of said cavity, and having its grain crossing that of the ring A, and a thick inflexible outer ring C fitting into the concave outer side of the reinforcing-layer, substantially as described.

2. A wooden wheel-rim, consisting of outer and inner thick and inflexible rings, one of said rings having a groove which is curved in cross-section, and the other of said rings being shaped to fit in said groove, and an intervening strengthening-strip, such as a veneer or layer of wood lying in said groove with its grain crossing the grain of the rings, adhesively secured to the said rings.

In testimony whereof I sign this specification, in the presence of two witnesses, this 29th day of January, 1896.

THEODOR KUNDTZ.

Witnesses:
C. H. DORER,
ELLA E. TILDEN.